United States Patent [19]

Yoshigai

[11] Patent Number: 4,735,106
[45] Date of Patent: Apr. 5, 1988

[54] BRAKE OPERATING DEVICE FOR BICYCLES
[75] Inventor: Toshiharu Yoshigai, Osaka, Japan
[73] Assignee: Yoshigai Kikai Kinzoku Co., Ltd., Higashi-Osaka, Japan
[21] Appl. No.: 18,428
[22] Filed: Feb. 25, 1987
[30] Foreign Application Priority Data
  Mar. 7, 1986 [JP]  Japan ................................ 61-50954
[51] Int. Cl.⁴ ............................................. B62K 23/06
[52] U.S. Cl. ................................... 74/489; 74/501 B;
       188/24.11; 188/24.12; 188/24.13; 188/24.14;
       188/24.21; 188/24.22; 188/196 BA; 267/155
[58] Field of Search ........................... 74/489, 501 B;
       188/24.11, 196 BA, 24.12, 24.13, 24.14, 24.21,
                                            24.22; 267/155

[56]              References Cited
          U.S. PATENT DOCUMENTS

| 1,366,904 | 2/1921 | Davis .................... | 267/155 |
| 1,974,342 | 9/1934 | Morris ................... | 267/155 |
| 2,824,463 | 2/1958 | Gleasman et al. ..... | 74/489 |
| 3,972,247 | 8/1976 | Armstrong ............ | 74/489 |
| 4,066,154 | 1/1978 | Ross ..................... | 74/489 |
| 4,674,353 | 6/1987 | Yoshigai ............... | 74/489 |

FOREIGN PATENT DOCUMENTS 23007 10/1956 Fed. Rep. of Germany .
 535285  9/1955 France ................... 74/489
1141954  3/1957 France .
  20124 of 1915 United Kingdom .

Primary Examiner—Andres Kashnikow
Assistant Examiner—Mark Le
Attorney, Agent, or Firm—Sixbey, Friedman & Leedom

[57] ABSTRACT

A brake operating device comprising a housing having a bearing portion, an operating lever supported by a pivot on the bearing portion, and a coiled return spring having a pair of engaging portions extending from the axial opposite ends of its coil portion laterally outward for biasing the lever in a returning direction. The coil portion of the spring is accommodated inside the operating lever and has its axis positioned in parallel with the axis of the pivot. One of the engaging portions is attached to the bearing portion, and the other engaging portion extends along the lever and has a slider slidably in contact with the lever inner surface. The spring is therefore retained in position, properly biasing the lever in the returning direction.

7 Claims, 3 Drawing Sheets

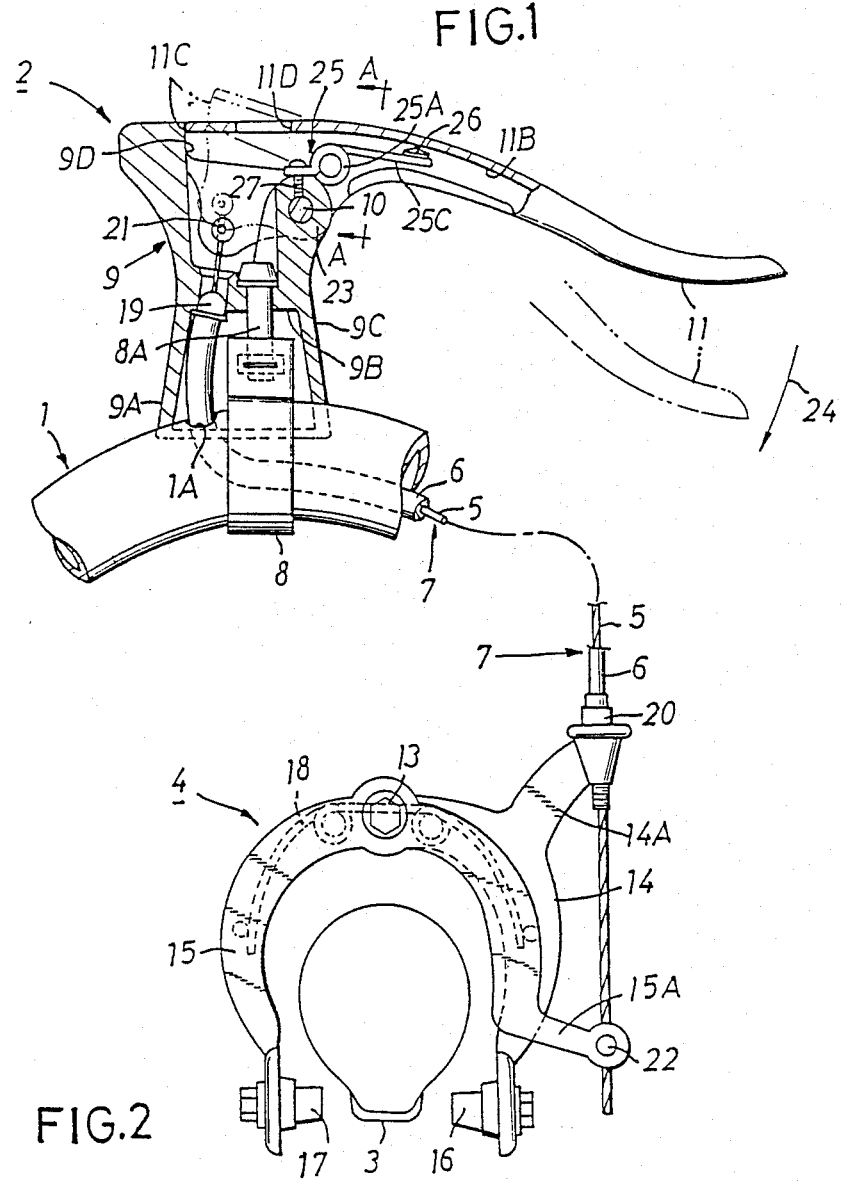
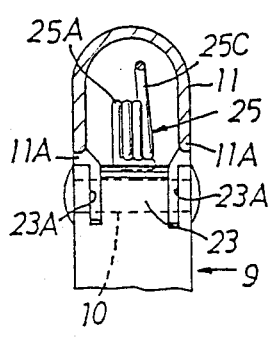
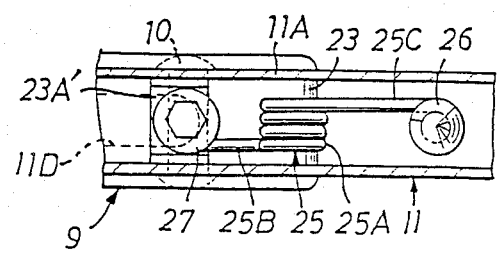
FIG.1
FIG.2
FIG.3

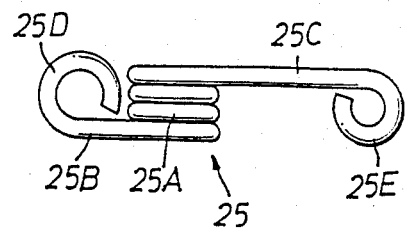
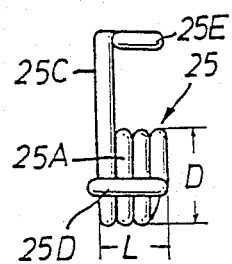
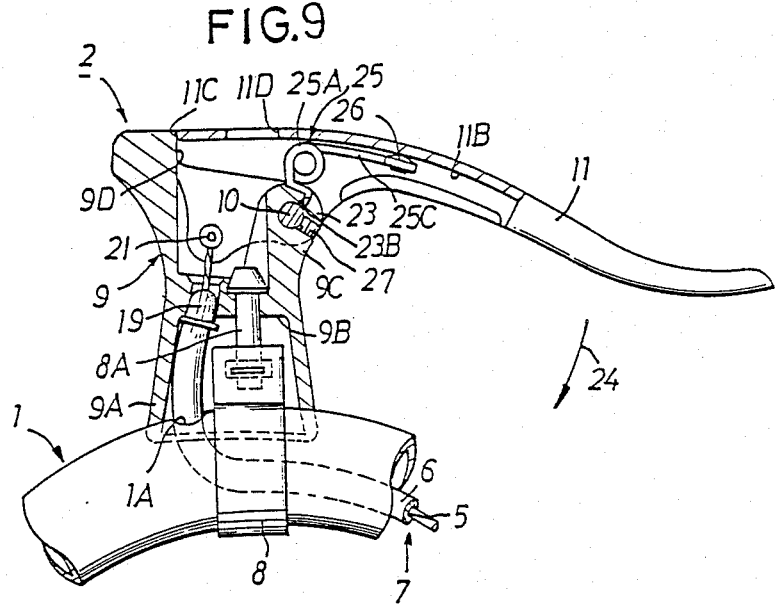

BRAKE OPERATING DEVICE FOR BICYCLES

FIELD OF THE INVENTION AND RELATED ART STATEMENT

The present invention relates to a brake operating device for bicycles.

Brake operating devices for bicycles comprise brake operating means including a housing mounted on the handlebar of the bicycle and a brake operating lever grippably attached to the housing; brake means for braking the wheel; and a Bowden cable including an inner wire and an outer wire coupling the brake operating means to the brake means to transmit a gripping force on the brake operating lever to the brake means in a direction to brake the wheel against a brake return spring of the brake means.

With the brake operating device of this type, the operating lever is returned to the original position by the force of the return spring of the brake means delivered to the lever through the Bowden cable.

In this case, the brake return spring must exert a considerably great force for returning the operating lever in view of the resistance of the Bowden cable, backlashes of the parts concerned, etc. This means that a correspondingly great lever operating force acts on the components of the device, possibly entailing a break of the lever, removal of the nipple portion and a malfunction.

Further even if the repellent force of the brake return spring is made considerably great, the operating lever is not always returnable properly. The greater the force of the return spring, the greater is the difficulty encountered in assembling and adjusting the brake means.

Accordingly, it has been proposed to provide a brake return spring also on the brake operating lever in addition to the return spring of the brake means so that the two springs afford the lever returning force which was given solely by the spring of the brake means in order to assure proper return of the operating lever and to preclude objections such as a break of the inner wire and removal of the nipple portion from the wire end. Such devices are disclosed in French Pat. No. 1,141,954 (conventional example 1), West German Pat. No. 23007 (conventional example 2) and British Pat. No. 20124.

According to the conventional example 1, the coil portion of a coiled return spring is provided around a pivot supporting the brake operating lever on the housing. The spring has one end engaged with the housing and the other end engaged with the brake operating lever to exert a resilient returning force on the brake operating lever.

Since the coil portion is provided around the pivot, the parts are very cumbersome to assemble and disassemble. Further because the coil portion diametrically contracts and restores itself, the diametrical contraction must be taken into consideration.

The conventional example 2 includes a return spring as accommodated in the brake operating lever which is U-shaped in cross section. The coil portion of the spring is fitted around a pin attached to the U-shaped portion of the lever. This example has the same problems as the example 1, while the pin for supporting the spring increases the number of parts needed.

The conventional example 3 includes a coiled return spring having one end engaged with the brake operating lever and the other end engaged with the handlebar or the housing to support the coil portion in suspension.

Although the return spring is relatively easy to handle for assembly or disassembly, the coil portion, which is in suspension, renders the spring readily removable owing to shaking or jolting, further making it difficult to transmit the resilient force of the spring properly.

OBJECTS AND SUMMARY OF THE INVENTION

An object of the present invention is to provide a device comprising a housing having a bearing portion, a brake operating lever pivoted to the bearing portion of the housing and a coiled return spring biasing the operating lever in a returning direction, the return spring having engaging portions extending from the axial opposite ends of its coil portion laterally outward in directions opposite to each other, one of the engaging portions being attached to the outer periphery of the bearing portion, the other engaging portion having a slider mounted thereon and slidably in contact with the inner surface of the operating lever, with the coil portion accommodated inside the lever, whereby the return spring is made to fully exert its resilient force on the lever while being prevented from jumping inadvertently.

Another object of the present invention is to provide a device of the type described wherein the free end of each of the two engaging portions of the spring is bent toward the coil portion, i.e. inward, to form a seat portion so that the coiled return spring can be accommodated in the limited inside space of the operating lever, with the coil portion restrained from expanding greatly, to exert its resilient force on the operating lever accurately.

Another object of the present invention is to provide a device of the type described wherein the lever is protected from damage although the lever is biased toward the returning direction by the spring attached to the bearing portion by one of the engaging portions and having the slider on the other engaging portion.

The present invention provides a device comprising a housing mountable on the handlebar of a bicycle and having a bearing portion, an operating lever having a portion of U-shaped cross section and grippably supported by a pivot on the bearing portion, and a coiled return spring having two engaging portions extending from the axial opposite ends of its coil portion laterally outward in directions opposite to each other for biasing the operating lever in a returning direction. The above objects of the invention can be fulfilled by the following technical features.

The coil portion of the spring is accommodated inside the operating lever between the bearing portion of the housing and the inner surface of the operating lever and has its axis positioned in parallel with the axis of the pivot. One of the engaging portions is attached to the bearing portion, while the other engaging portion extends longitudinally of the lever and has a slider at its foward end. The slider is slidably in contact with the inner surface of the operating lever. The spring is thus adapted to bias the lever in the returning direction.

BRIEF DESCRIPTION OF THE DRAWINGS

FIG. 1 is an ovarall view partly in section and showing a first embodiment;

FIG. 2 is a view in section taken along the line A—A in FIG. 1;

FIG. 3 is a fragmentary plan view of the same;

FIG. 5 is a plan view showing a return spring included in the first embodiment in a free state;

FIG. 7 is a rear view showing the same;

FIG. 9 is a sectional view showing a brake operating assembly according to a second embodiment;

DESCRIPTION OF THE PREFERRED EMBODIMENTS

Figure 4:
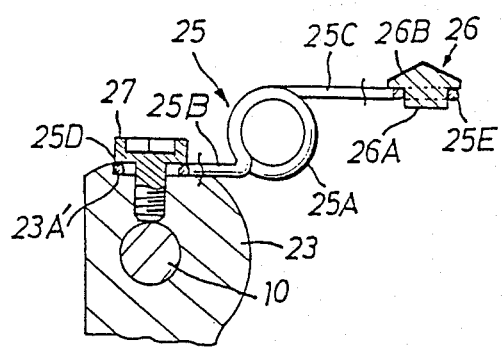
FIG. 4 is a side elevation of the same.

Embodiments of the invention will be described below in detail with reference to the drawings. Throughout the drawings, like parts are designated by like reference numerals.

FIG. 1 shows brake operating means 2 mounted on a drop-type handlebar 1 and coupled to side-pull brake means 4 for braking a wheel 3, such as a front or rear wheel, by a Bowden cable 7 including an inner wire 5 and an outer wire 6.

The brake operating means 2 includes a boxlike housing 9 attached to the handlebar 1 by a band 8 and a fastening screw 8A, and an operating lever 11 grippably supported by a pivot 10 on the housing 9.

The brake means 2 comprises a pair of brake arches 14, 15 mounted on a center bolt 13, brake shoes 16, 17 mounted on the arches 14, 15, respectively, and a brake return spring 18, which resembles spectacles in the present embodiment, for returning the brake arches 14, 15.

The outer wire 6 of the Bowden cable 7 is held at its one end to the housing 9 by a support 19. The other end of the wire 6 is held by a support 20 to one of the arches 14, 15, i.e. the arm 14A of the arch 14 according to the present embodiment.

The inner wire 5 of the cable 7 is connected at its one end to the brake operating lever 11 by a holder 21. The other end of the wire 5 is connected by a holder 22 to the arm 15A of the arch 15 in the present case.

The Bowden cable 7 is inserted through a hole 1A formed in the handlebar 1 and partly extends through the bar 1.

The housing 9 has a skirt portion 9A seated on the handlebar 1 and a partition wall 9B internally formed at an intermediate portion of its height. The partition wall 9B has the outer wire support 19 fitted therein and the fastening screw 8A inserted therethrough.

Above the partition wall 9B, the housing has an upstanding wall 9C provided with a bearing portion 23 which has a circular-arc outer periphery when seen from one side.

As seen in FIG. 2, the bearing portion 23 is formed with a pair of slits 23A. The side walls 11A of the lever 11, which is U-shaped in cross section, are inserted in the slits 23A and supported by the pivot 10. The operating lever 11 is movable about the pivot 10 in the direction of arrow 24 shown in FIG. 1 by gripping.

The housing 9 is prepared from aluminum, aluminum alloy or like light alloy by die-casting.

A lever return spring 25 is accommodated in the U-shaped interior space of the lever, as positioned between the outer periphery of the bearing portion 23 of the housing 9 and the inner surface 11B of the operating lever 11.

Figure 6:
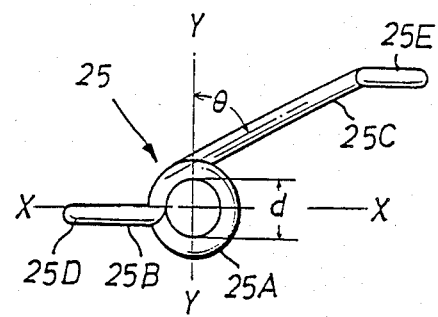
FIG. 6 is a side elevation showing the spring.

The return spring 25 is made of a round resilient wire, 1.4 mm in diameter. With reference to FIGS. 5 to 7, the spring 25 has a coil portion 25A which is 8 mm in outside diameter D, 5 mm in inside diameter d and 6 mm in axial length L. Engaging portions 25B, 25C extend straight from axial opposite ends of the coil portion 25A laterally outward in directions opposite to each other. When seen in the plan view of FIG. 5, the engaging portions 25B and 25C extend in parallel with each other, and one of them is long and the other is short. In a free unloaded state, the engaging portion 25B is on a horizontal plane X—X through the center of the coil portion 25A as shown in FIG. 6. The engaging portion 25C is inclined at an angle $\theta$, for example, of 62 degrees with a vertical plane Y—Y through the center of the coil portion 25A. The free ends of the engaging portions 25B and 25C are bent in the form of a circular arc toward the coil portion 25A to provide seat portions 25D and 25E, respectively, as seen in FIG. 5. When seen sidewise as shown in FIG. 6, the seat portions are parallel to each other.

Figure 8:
FIG. 8 is a front view of a slider.

With reference to FIG. 8, a slider 26 resembling a mushroom comprises a shank 26A and a button-like portion having conical flange 26B and is made of a rigid resin. As shown in FIGS. 3 and 4, the shank 26A is fitted in the seat portion 25E.

The seat portion 25D of the engaging portion 25B is fitted in a cavity 23A' formed in the outer periphery of the bearing portion 23 and is attached to this portion 23 by a fastening screw 27 having a socket head, as seen in FIGS. 3 and 4. The coil portion 25A has its axis positioned in parallel with the axis of the pivot 10. The engaging portion 25C extends along the lever 11, and the vertex of the slider 26 is slidably in contact with the inner surface 11B of the lever.

When the return spring 25 is installed in place, the engaging portion 25C having the angle of inclination, $\theta$, is pressed on by the lever inner surface 11B, whereby a resilient force is accumulated in the engaging portions 25C and the coil portion 25A. The repellent resilient force acts to press the head 11C of the operating lever 11 against an upstanding bearing face 9D of the housing 9.

The present device is assembled in the following manner. The housing 9 is mounted on the handlebar 1, and the return spring 25 is fastened to the bearing portion 23 by the screw 27. In this state, the side walls 11A of the operating lever 11 having the inner wire 5 connected thereto are fitted into the slits 23A in the bearing portion 23 and supported by the pivot 10. When the lever is thus mounted, the slider 26 on the spring 25 is pressed on by the inner surface 11B of the lever, whereby a resilient force is accumulated in the engaging portion 25C and the coil portion 25A to press the head 11C against the upstanding face 9D.

After the device has been assembled, the fastening screw 27 can be rotated by a tool inserted through a tool hole 11D formed in the lever 11.

The fastening screw 27 serves as means for fixing the return spring 25 in place. Further the forward end of the screw 27 bears on the outer periphery of the pivot 10 as seen in FIG. 4, whereby the pivot 10 is restrained from rotating about its own axis.

Figure 10:
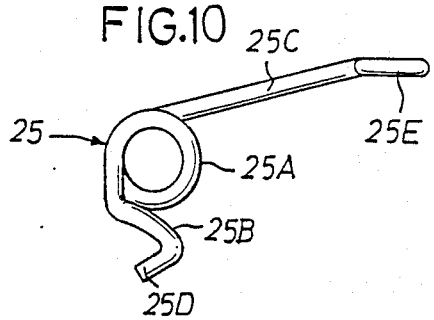
FIG. 10 is a side elevation showing a return spring included in the second embodiment.

The embodiment shown in FIGS. 9 and 10 has the same construction as the first embodiment which has been described with reference to FIGS. 1 to 8 except that the return spring 25 has a different form and that different means is used for preventing the rotation of the pivot 10 about its own axis.

More specifically stated, the engaging portion 25B of the return spring 25 is curved along the circular arc outer periphery of the bearing portion 23 and has a forward end which is not arcuate but is in the form of a straight projection to provide a seat portion 25D. The projecting seat portion 25D is inserted in a bore 23B formed in the bearing portion 23 and extending toward the serve as means for fixing the return spring 25 in position. A fastening screw 27 is screwed into the housing 9 from the rear side thereof into pressing contact with the pivot 10, thus serving as means for preventing the rotation of the pivot 10.

Figure 11:
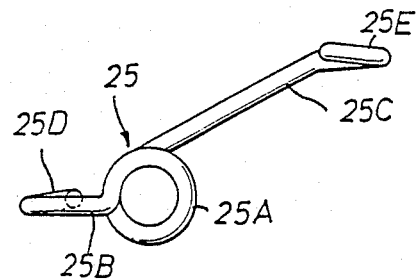
FIG. 11 is a side elevation corresponding to FIG. 6 and showing another example of return spring.

FIG. 11 shows an improvement in the return spring 25 shown in FIGS. 1 to 4. The seating portions 25D, 25E of the spring 25 are so improved as to have the function of a washer. When the fastening screw 27 is inserted through the seating portion 25D, the head of the screw 27 deforms the seating portion 25D elastically to prevent the screw 27 from loosening. The seating portion 25E also serves to prevent the slider 26 from slipping off.

With the foregoing embodiments, the brake means 4 may be of the desired type, such as center-pull type, cantilever type or hand brake type, insofar as it is provided with a brake returning spring for returning the actuated brake to the original position.

Although the coil portion 25A of the return spring 25 is held out of contact with the outer periphery of the bearing portion 23 by a space as seen in FIG. 4, the coil portion 25A may alternatively be in contact with the bearing portion 23.

When the brake is to be actuated by the device of the present invention, the operating lever 11 is grasped in the direction of arrow 24 shown in FIG. 1 or 9 against the brake return spring 18 and the lever return spring 25, whereby the operating force is delivered through the Bowden cable 7.

With the engaging portion 25B of the spring 25 fastened to the bearing portion 23, the slider 26 on the engaging portion 25C slides along the inner surface 11B of the lever 11, giving a returning resilient force to the lever 11. This elastically deforms the engaging portion 25C and diametrically contracts the coil portion 25A.

Since the seating portions 25D, 25E are formed by bending the spring wire toward the coil portion 25A, the spring 25 is prevented from twisting even if elastically deformed, while the spring can be accommodated compactly in a small space.

With the vertex of the slider 26 slidably in contact with the inner surface 11B, damage to the lever is avoidable, while the arrangement assures the engaging portion 25C of proper elastic deformation.

Subsequently, when released from the grasping force, the operating lever 11 is returned to its original position by the spring 25, and the brake means 4 is reliably returned by the brake return spring 18. Since the return spring 25 is prevented from jumping, the lever head 11C can be brought into pressing contact with the upstanding bearing face 9D reliably.

The brake return spring 18 need not exert a repellent force to return the operating lever 11 but has only to apply a force to return the brake means 4, so that the arrangement can be made simple in construction and easy to assemble and adjust.

If the operating lever 11 were returned only by the action of the brake return spring 18, a strong spring would be necessary in view of the resistance of the Bowden cable 7 and backlashes of the parts concerned, whereas there is no need to consider the resistance of the Bowden cable 7, etc. according to the invention because the returns springs 18, 25 are provided for the brake means 4 and the operating lever 11, respectively. Consequently, the overall operating force can be smaller than is heretofore needed.

This advantage diminishes the likelihood of early break of the inner wire 5 of the Bowden cable 7, removal of the nipple portion (outer wire support or the like), etc., obviates malfunctioning and assures a smooth braking operation.

What is claimed is:

1. A brake operating device for a bicycle comprising a housing mounted on the handlebar of the bicycle and having a bearing portion, an operating lever having a portion of U-shaped cross section and grippably supported by a pivot on the bearing portion, and a coiled return spring having engaging portions extending from the axial opposite ends of its coil portion laterally outward for biasing the operating lever in a returning direction, the device being characterized in that the coil portion of the spring characterized in that the coil portion of the spring is accommodated inside the operating lever between the bearing portion of the housing and the inner surface of the lever and has its axis positioned in parallel with the axis of the pivot, one of the engaging portions being attached to the bearing portion, the other engaging portion extending longitudinally of the operating lever and having a contact means for producing a smooth movement of the spring over the inner surface of the operating lever, said contact means being seated on the forward end of the spring and being in contact with the inner surface of the operating lever, whereby the operating lever is biased in the returning direction.

2. A device as defined in claim 1 wherein one of the engaging portion is long and the other engaging portion is short, the short engaging portion being attached to the bearing portion of the housing, the spring having a force accumulated therein by the long engaging portion being elastically deformed from its free state by the lever.

3. A device as defined in claim 1 wherein the forward end of each of the engaging portions of the spring is bent toward the coil portion to provide a seat portion.

4. A brake operating device for a bicycle comprising a housing mounted on the handlebar of the bicycle and having a bearing portion, an operating lever having a portion of U-shaped cross section and grippably supported by a pivot on the bearing portion, and a coiled return spring having engaging portions extending from the axial opposite ends of its coil portion laterally outward for biasing the operating lever in a returning direction, the device being characterized in that the coil portion of the spring is accommodated inside the operating lever between the bearing portion of the housing and the inner surface of the lever and has its axis positioned in parallel with the axis of the pivot, one of the engaging portions being attached to the bearing portion, the other engaging portion extending longitudinally of the operating lever and having a slider at its forward end, the slider being slidably in contact with the inner surface of the operating lever, whereby the operating lever is biased in the returning direction, and wherein the slider is made of a resin and has a shank portion and a conical flange, the vertex of the conical flange being slidably in contact with the inner surface of the lever.

5. A device as defined in claim 1 wherein said one engaging portion is attached to the bearing portion by a fastening screw, and the fastening screw prevents the pivot from rotating about its own axis.

6. A device as defined in claim 1 wherein said one engaging portion is attached to the bearing portion by means comprising a curved portion formed by bending said engaging portion along the outer periphery of the bearing portion, and a projection extending straight from the curved portion and inserted in the bearing portion toward the pivot.

7. A device according to claim 1, wherein said contact means makes slidable contact with the inner surface of the operating lever on top of a button-like portion thereof.

* * * * *

REEXAMINATION CERTIFICATE (1017th)
United States Patent [19]
Yoshigai

[11] B1 4,735,106
[45] Certificate Issued Feb. 21, 1989

[54] BRAKE OPERATING DEVICE FOR BICYCLES

[75] Inventor: Toshiharu Yoshigai, Osaka, Japan

[73] Assignee: Yoshigai Kikai Kinzoku Co., Ltd., Osaka, Japan

Reexamination Request:
No. 90/001,518, May 27, 1988

Reexamination Certificate for:
Patent No.: 4,735,106
Issued: Apr. 5, 1988
Appl. No.: 18,428
Filed: Feb. 25, 1987

[30] Foreign Application Priority Data

Mar. 7, 1986 [JP] Japan ................... 61-50954

[51] Int. Cl.⁴ ............................................. B62K 23/06
[52] U.S. Cl. ................................. 74/489; 74/501 B;
188/24.11; 188/24.12; 188/24.13; 188/24.14;
188/24.21; 188/24.22; 188/196 BA; 267/155
[58] Field of Search ........................................ 74/489

[56] References Cited
U.S. PATENT DOCUMENTS
1,974,342  9/1934  Morris ........................... 267/155

FOREIGN PATENT DOCUMENTS

| | | |
|---|---|---|
| 419481 | 1/1937 | Belgium . |
| 23007 | 11/1956 | Fed. Rep. of Germany . |
| 7521839 | 9/1975 | Fed. Rep. of Germany . |
| 1141954 | 3/1957 | France . |
| 25416 | 6/1976 | Japan . |
| 52-5392 | 2/1977 | Japan . |
| 20124 | of 1915 | United Kingdom . |
| 698136 | 10/1953 | United Kingdom . |

OTHER PUBLICATIONS

Shimano *Bicycling; Winning*, Aug. 1987, p. 5.

*Primary Examiner*—Andres Kashnikow
*Assistant Examiner*—Mark Le

[57] ABSTRACT

A brake operating device comprising a housing having a bearing portion, an operating lever supported by a pivot on the bearing portion, and a coiled return spring having a pair of engaging portions extending from the axial opposite ends of its coil portion laterally outward for biasing the lever in a returning direction. The coil portion of the spring is accommodated inside the operating lever and has its axis positioned in parallel with the axis of the pivot. One of the engaging portions is attached to the bearing portion, and the other engaging portion extends along the lever and has a slider slidably in contact with the lever inner surface. The spring is therefore retained in position, properly biasing the lever in the returning direction.

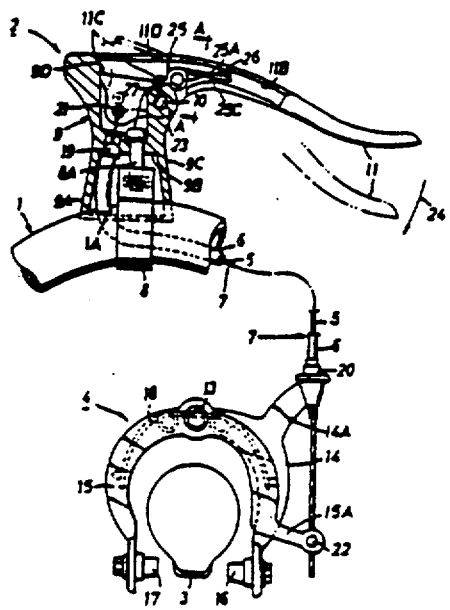

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-7 is confirmed.

* * * * *